May 26, 1925.
W. H. WISNER
METHOD AND MEANS FOR TELEGRAPHING PHOTOGRAPHS
Filed Nov. 1, 1923 2 Sheets-Sheet 1
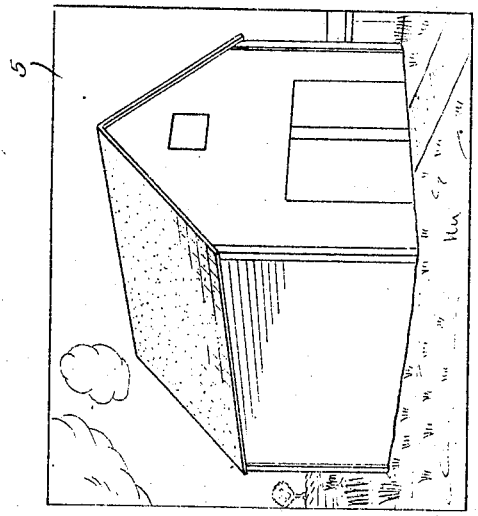
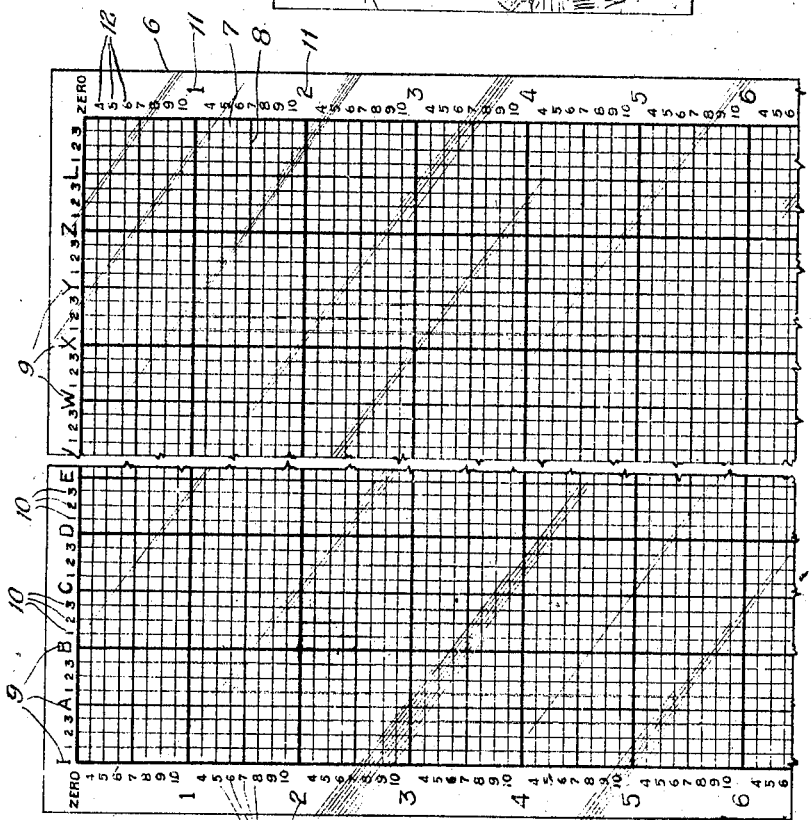

May 26, 1925. 1,538,916
W. H. WISNER
METHOD AND MEANS FOR TELEGRAPHING PHOTOGRAPHS
Filed Nov. 1, 1923 2 Sheets-Sheet 2

Inventor:
William H. Wisner.
By: Thomason, Roodhouse & Lundy Attys

Patented May 26, 1925.

1,538,916

UNITED STATES PATENT OFFICE.

WILLIAM HENRY WISNER, OF CHICAGO, ILLINOIS, ASSIGNOR TO THE TRIBUNE COMPANY, OF CHICAGO, ILLINOIS, A CORPORATION OF ILLINOIS.

METHOD AND MEANS FOR TELEGRAPHING PHOTOGRAPHS.

Application filed November 1, 1923. Serial No. 672,089.

*To all whom it may concern:*

Be it known that I, WILLIAM H. WISNER, a citizen of the United States, and a resident of Chicago, in the county of Cook and State of Illinois, have invented certain new and useful Improvements in a Method and Means for Telegraphing Photographs, of which the following is a full, clear, and exact description, such as will enable others skilled in the art to make and use the same.

My invention relates to a method of, and instrumentalities for descriptive transmission of photographs, pictures, and the like from one locality to another or distant points. More specifically, this invention appertains to the telegraphic transmission of photographs and other pictorial matter from the points where the picture or photograph is made to remote points where the same may be reproduced from the descriptive matter that has been transmitted.

It is the practice in newspapers, periodicals, and similar publications to reproduce by the half-tone or etching process photographs and pictures for use in the publications so that the readers may visualize interesting occurrences and current events.

In the daily newspapers it has recently become the practice of sending pictures by special railway trains, by aeroplane, and by other swift means of transportation in order to "scoop" competitors, but the expense incident to such modes of transmission is exorbitant. Unless the occurrence or event is of the most interesting character or one of great national importance it hardly recompenses a newspaper publisher to go to this enormous expense of transporting a photograph. The readers of modern newspapers are anxious to obtain views and pictures of current events within a short time after they occur. Divers means have been employed for transmitting the descriptions of pictures or photographs by means of the telegraph. In connection with my improvements, I employ a code, and I also employ a graph or plat that is transparent so that when it is superposed upon the picture to be transmitted at the locality where taken the points and lines of the picture may be observed and definitely located. These points and lines may be readily distinguished from each other and identified by symbols to indicate the respective lines of a series of intersecting parallel lines. Also, I employ a graph or plat that is printed upon a suitable drawing paper or cardboard so that, as the description of the points and lines are received at the receiving station in the code of the symbols, the same may be readily deciphered by an artist who sketches or delineates the same upon the board before him. Also, in connection with my method I employ brief descriptive matter which is transmitted, during the sending of the code so as to insure against mistakes or errors in transmission.

It is therefore obvious that the objects of my invention reside principally in the provision of a method or mode of transmission of pictures and the like which is simple to understand and which will permit of the picture being transmitted from one location to a remote point very rapidly and at considerable less expense than has heretofore been accomplished. I do this in a novel and simple manner, and without the use of expensive paraphernalia.

I prefer to carry out my invention in substantially the manner hereinafter fully described and as more particularly pointed out in the claims. Reference will now be made to the accompanying drawings that illustrate a typical embodiment of my invention.

In the drawings:

Figure 1 is a fragmentary plan of the transparent graph or chart that is used at the sending or transmitting station.

Fig. 2 represents a picture or photograph that is to be transmitted, and upon which the transparent graph is to be superposed.

In the drawings, I have employed similar reference characters to designate like parts wherever they occur throughout the several views.

Figure 4:
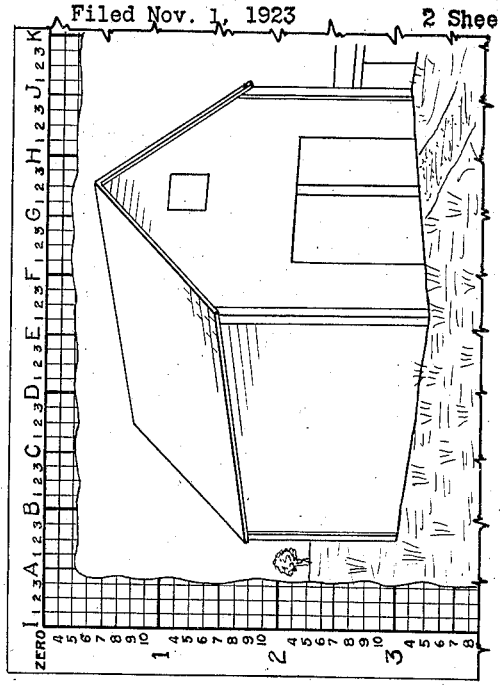
Fig. 4 is a view of the picture when finished at the receiving station.
Figure 3:
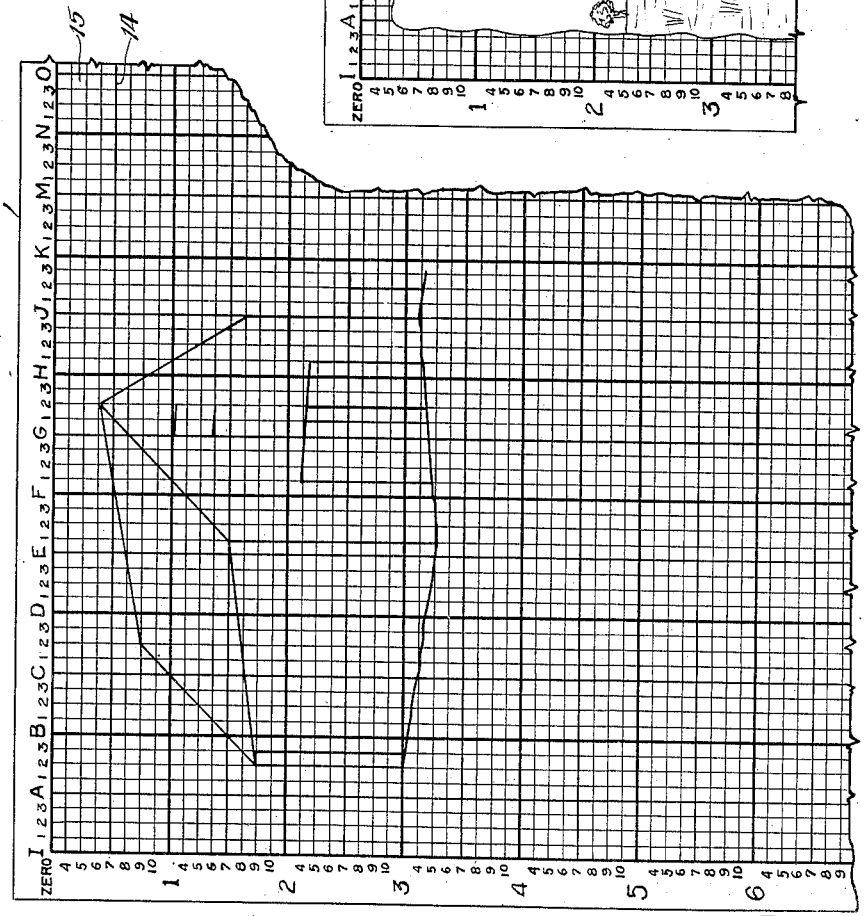
Fig. 3 is a fragmentary plan of the graph board that is used at the receiving station and showing thereon a picture partly sketched.

A photograph or picture, 5, shown in Figure 2, is a reproduction of a barn for the purpose of simplicity. When the picture is to be transmitted, the operator at the transmitting station places over or superposes upon the picture 5 a graph such as shown in Figure 1. This graph comprises a sheet of transparent material 6 of suitable dimensions, preferably rectangular in outline and bearing upon its surface a plurality of intersecting lines, the vertical lines being designated as 7 and the horizontal lines being designated as 8 in Figure 1. Upon the longitudinal upper and lower margins of the sheet, I place identifying indicia in the form of letters such as I, A, B, etc., designated by the reference character 9. These letters identify each fourth vertical line, and which, as seen in the drawings, are slightly heavier than the intermediate vertical lines, the latter being designated by numerals 1, 2, and 3 and identified in the drawings by reference character 10. Upon the end margins, I place indicia in the form of large numerals 1, 2, 3, etc., identified in the drawing by the reference character 11, which numerals designate the heavy horizontal lines, while the intermediate lighter lines are identified by the numbers "4" to "10" inclusive which are designated in Figure 1 of the drawings by the reference character 12. With this arrangement of indicia the sending or transmitting operator may readily identify any point or line in the photograph by the intersection of a longitudinal and a transverse line and he will send such point or line to the receiving station by telegraphing the indicia which identifies the respective lines on the graph.

The graph employed at the receiving station is preferably a card-board or some suitable drawing sheet 13 having upon its face parallel longitudinal and transverse lines 14 and 15 respectively, which lines are identified upon the margins of the sheet 13 by the same indicia as employed upon the transparent or transmitting chart so that the receiving operator, as he receives the code telegraphed to him from the sending station may readily identify the points and lines so transmitted.

Prior to sending the actual lines and points of the photograph, the transmitting operator sends a brief description of the picture which is not in code but which gives the receiving station operator a general idea of what the picture consists. For example, the transmitting operator might send the following preliminary descriptive message for the picture shown in Figure 2, viz:—

"Barn with shingled hip roof. Clap board sides. Entrance at right with double barn door. Hayloft window above door. Wagon tracks leading from door, and fence post and rail at right to edge of matt. Shrubbery growing in left foreground and tree in left background at one side of left end of barn."

The sending operator then begins to transmit the code indicating the lines and points of the picture as he observes the same through the transparent sheet 6. Such a code might read as follows:—

"Roof ridge begins 6G2 extends left and down to 9C2. Then slopes to left to 19A2. Left eaves extend from this point up to 17E1 then up to start. Right slope of roof down to 18J. Ground at left of side wall begins at 30A2 irregular to left front corner at 35E1 then to front right corner at 34J."

The sending operator continues to codify the points and lines of the picture as he observes them through the transparent chart or graph 6, and at the receiving station the code is constantly being deciphered and the artist is delineating the same upon his graphic chart 13. After the lines have been drawn in by the artist the picture may be finished or filled in by retouching, and the gray and dark tones may be added to indicate shading, after which the picture, which has been drawn at the receiving station is photographed and reproduced upon a half-tone plate ready for printing in the ordinary manner.

Thus it will be seen that no matter how complicated the picture may be sending station will be able to describe and transmit the lines and points thereof by observing them through the transparent chart, and the receiving station will be able to transfer the same into a graphic picture which may be readily reproduced for publication in the newspaper or other periodical. It is obvious that other expedients may be employed in lieu of those which I have herein disclosed, and I desire it understood that such modifications are fully contemplated as coming within the scope of my appended claims.

What I claim is:—

1. The method of descriptive transmission of pictures consisting of initially transmitting a brief preliminary description of the images in the picture and their relative locations whereby the receiver may first visualize the general concept of the picture to be transmitted; then transmitting the lines of the images as they appear through a cross-lined screen that is supported upon the picture and has line identifying indicia upon its margins; and thereafter progressively delineating the so transmitted lines and points upon a sheet bearing corresponding lines and indicia.

2. A device for use in the transmission of pictures comprising a transparent sheet, a plurality of intersecting lines dividing the sheet into definitely shaped areas, major indicia upon the margins of said sheet identifying the respective lines, secondary intersecting lines disposed intermediate the aforesaid lines dividing said areas into smaller sections, and minor indicia intermediate the aforesaid indicia, the minor indicia on one margin following in consecutive order the minor indicia on a margin transverse thereto whereby confusion of the minor indicia is avoided.

3. A device for use in the transmission of pictures comprising a transparent sheet, a plurality of intersecting heavy lines dividing the sheet into definitely shaped areas, large ordinals upon the margins of said sheet identifying the respective lines, intersecting lines of lesser visibility disposed intermediate the aforesaid heavy lines and dividing said areas into smaller correspondingly shaped sections, and numerals intermediate the aforesaid ordinals, the numerals on one margin in sequence the numerals on a margin transverse thereto whereby confusion on the minor indicia on one margin with the minor indicia upon a transverse margin is avoided.

Signed at Chicago, county of Cook and State of Illinois, this 30th day of October, 1923.

WILLIAM HENRY WISNER.